United States Patent [19]

Aaker et al.

[11] Patent Number: 4,971,845

[45] Date of Patent: Nov. 20, 1990

[54] HEAT-SHRINKABLE, HEAT-SEALABLE THERMOPLASTIC LAMINATE FILM

[75] Inventors: Ravland T. Aaker, Sarasota, Fla.; Charles L. Stroud, Peachtree City, Ga.

[73] Assignee: Star Packaging Corporation, College Park, Ga.

[21] Appl. No.: 328,334

[22] Filed: Mar. 24, 1989

[51] Int. Cl.⁵ .............................................. B65B 53/00
[52] U.S. Cl. ................... 428/34.9; 428/349; 428/423.7; 428/424.2; 428/480; 428/483; 428/910
[58] Field of Search ............... 428/483, 480, 34.9, 428/349, 423.7, 424.2, 910

[56] References Cited

U.S. PATENT DOCUMENTS

| | | | |
|---|---|---|---|
| 4,716,061 | 12/1987 | Winter | 428/483 X |
| 4,742,957 | 5/1988 | Park | 428/483 X |
| 4,762,748 | 8/1988 | Oberle | 428/34.9 |
| 4,803,102 | 2/1989 | Raniere et al. | 428/483 X |
| 4,804,565 | 2/1989 | Rast | 428/483 X |
| 4,816,308 | 3/1989 | Shimizer et al. | 428/483 X |

Primary Examiner—Edith Buffalow
Attorney, Agent, or Firm—Needle & Rosenberg

[57] ABSTRACT

A heat-sealable, heat-shrinkable laminate film having a first layer of heat-shrinkable thermoplastic material and a second layer of heat-sealable, heat-shrinkable thermoplastic material adhered to the first layer, the materials of the first and second layers having similar shrink characteristics.

20 Claims, 1 Drawing Sheet

HEAT-SHRINKABLE, HEAT-SEALABLE THERMOPLASTIC LAMINATE FILM

BACKGROUND OF THE INVENTION

The present invention relates to the packaging field, and more particularly to a laminated thermoplastic film which can be used to produce a heat-sealable, heat-shrinkable bag having a polyester external surface.

The use of heat-shrinkable thermoplastic films is well known to the packaging industry. For example, poultry products are typically sealed within bags made from such films and heated, thus shrinking the bag until it fits tightly about the product.

One type of thermoplastic material currently used to form such bags is monolayer polyester film. Polyester bags have many advantages. For instance, they provide strength and protection through tight adhesion to the product. Also, printing onto treated polyester tends to be somewhat more stable than onto other thermoplastic materials. However, a problem exists in that polyester is not heat-sealable except at exceptionally high temperatures, and as a result such bags must be sealed with adhesive. Bags sealed with adhesive are not as strong in the seal area as than heat sealed bags, cannot be closed on the open end by existing heat seal equipment and cannot be printed so as to lock or protect the printing.

A second type of heat-shrinkable bag currently in use is made of co-extruded, heat-shrinkable, thermoplastic films, such as polyolefin. For example, U.S. Pat. No. 3,299,194 to Golike and U.S. Pat. No. 3,663,662 to Golike et al. disclose shrink films of oriented polyethylene and various copolymers of ethylene. U.S. Pat. No. 4,597,920 to Golike teaches a shrink films which is a copolymer of ethylene with at least one $C_8$–$C_{18}$ α-olefin. Methods for producing multi-layer thermoplastic film are provided in U.S. Pat. No. 2,855,517 to Rainer et al., U.S. Pat. No. 3,022,543 to Baird, U.S. Pat. No. 3,754,063 to Schirmer, and U.S. Pat. No. 3,981,008 to D'Entremont.

Coextruded films, such as polyolefins, are useful in producing heat-shrinkable bags because they are heat-sealable and therefore can be produced on existing heat seal equipment economically. They maintain good physical contact with a packaged product after heat shrinking, and thereby retain juices within packaged meats, but not as well as the laminated shrink bags. However, coextruded films have different mechanical properties, such as tensile strength and modulus, and therefore bags made from these films are more apt to tear or otherwise become physically damaged during handling than a multilayer lamination. Another important disadvantage is that you cannot reverse print or lock the print between the film layers, whether by surface or reverse print, with coextruded films, making them exposed to abuse, abrasion, and removal of the print by physical or chemical action.

Therefore, there exists a need for a thermoplastic film which combines the advantages and eliminates the disadvantages associated with monolayer polyester and coextruded films.

More particularly, there exists a need for a film which is strong, which is heat-sealable, and which eliminates the problem associated with surface printing.

SUMMARY OF THE INVENTION

The present invention relates to a heat-sealable, heat-shrinkable laminate film, as well as a bag or other packaging produced from the film.

The film is comprised of first layer of heat-shrinkable thermoplastic material laminated to a second layer of heat-sealable, heat-shrinkable thermoplastic material which has similar shrink characteristics to the first layer and an adhesive which adheres the two layers together. In this way, the first and second layers will shrink at approximately equal rates, thereby providing a uniform appearance and structural stability both during the lamination process and in a package produced with the film.

In one embodiment, the first layer may be a polyester, such as polyethylene terephthalate, and the second layer may be a polyolefin, such as polypropylene or polyethylene. The two layers may be adhered together on a standard laminating machine using processes that allows the lamination to occur without undue shrinking.

The film may be used to produce a heat-shrinkable package, such as a bag. For example, a length of the film may be folded to form two sections so that the second layers of each section contact one another to form the inner surface of the bag and the first layers form the outer surface of the bag. The edges of the sections may be heat-sealed to adhere the second layers together and produce the final bag structure.

Therefore, it should be clear that the present invention provides a thermoplastic film which combines the advantages and eliminates the disadvantages associated with monolayer polyester and co-extruded films. For instance, the film of the present invention may be used to produce a bag having a strong, printable polyester outer surface and a clean, heat sealable inner surface. Furthermore, indicia may be reverse printed on the inner surface of the first layer, or, the surface of the second layer, and thereby protected in the final product.

These and other advantages are explained in more detail in the following detailed description.

DETAILED DESCRIPTION OF THE INVENTION

Figure 1:
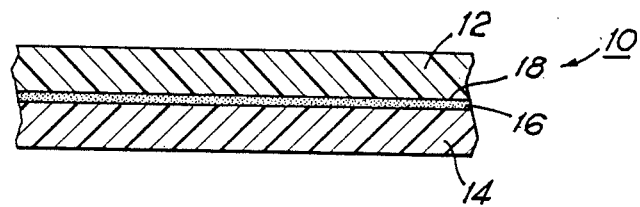
FIG. 1 is a schematic diagram representing a cross-sectional view of the film of the present invention.

The heat-sealable, heat-shrinkable thermoplastic laminate film of the present invention has the cross-sectional appearance shown in FIG. 1. The film 10 comprises a substrate 12, or first layer, adhered to a second layer 14, by means of a layer of adhesive 16.

The substrate 12 is comprised of a sheet of polyester, such as HS heat-shrinkable polyethylene terephthalate (see, R. W. Moncrieff, Man-Made Fibres, John Wiley and Sons, New York, 4th ed., 1963). Polyethylene terephthalate typically has gauges from 50 to 150 and is designed to shrink approximately 50% at a temperature of 100° C. The specific type of polyethylene terephthalate employed depends upon the specific end use of the film 10. For example, if the end use is one that does not require a high barrier against moisture transmissions or oxygen permeability, the substrate 12 may be polyethylene terephthalate types HSV-65 or HSV-150, available from E. I. Du Pont de Nemours Company, Wilmington, Delaware. If an extremely high barrier against moisture vapor transmission, as well as against oxygen permeability, is desired, types XM-927-65 or XM 927-150, available from E. I. Du Pont de Nemours Company, Wilmington, Delaware, may be employed. These "XM" types are polyethylene terephthalate film coated with a polyvinyldine chloride coating, and are particularly useful for extending the shelf lives of meat or poultry products. A third type of film, such as HS-65 and HS-150, available from E. I. Du Pont de Nemours Company, Wilmington, Delaware, has a relatively high melting point and therefore is desirable for use in high temperature applications such as cooking meat products.

The second layer 14 may be of any thermoplastic material which is heat-sealable and which has approximately the same shrinking characteristics, attained by a blow-up ratio or orientation, as the substrate 12. For example, the second layer 14 may be comprised of a polyolefin, such as polypropylene or polyethylene. Also, a 1.00 mil to 3.00 mil ionomer extrusion produced by Tara Plastics of College Park, Georgia from one of #1601, #1650 and #1652 Surlyn® resin (ethylene-methacrylic acid di-and ter-polymers) supplied by E. I. DuPont de Nemours and Company may be used. The ionomer is particularly useful in that it has been found to adhere to packaged meat during cooking and prevent loss of juices therefrom during this process. The second layer 14 may be produced by standard extruding to a blow-ratio or orientation conducive to shrink, and should achieve an approximately 50% shrink at 100° C.

The term "shrink characteristics" means the ability of film to be oriented in such a way as to cause it to shrink in size, both longitudinally and latitudinally when subjected to certain temperature levels. This orientation causes a change in the molecular structure of the film, that when subjected to the higher temperature causes this molecule configuration to attempt to return to its original structure. This can be done in a number of ways, but all include the changing of time, temperature and pressure on the film.

The adhesive layer 16 may be comprised of any type of adhesive which will effectively secure the substrate 12 to the second layer 14 for the intended purposes of the film 10. For example, the adhesive must maintain the attachment at high temperatures so that the film 10 can survive heat shrinking, as well as cooking if so desired, without damage. One adhesive which may be used is a polyurethane type lamal HSA adhesive and a CR180 catalyst, available from Morton Thiokol Inc., Morton Chemical Division, Chicago, Illinois. Another type of adhesive may be a water based adhesive, such as Morton #2018.

Printed matter 18 may be placed onto the substrate 12 in any known manner. The printing may be provided on the outer surface 20 of the substrate 12, in which case the printing process may be performed either before or after the adhering of the substrate 12 and second layer 14. It is also possible to provide the printed matter 18 on the inner surface 22 of the substrate 12 so that the printing becomes protected between the substrate 12 and second layer 14 in the film 10. Printed matter 18 may also be placed on the inside surface of sealing layer 16 in which case the printed matter would also become protected between the substrate 12 and the second layer 14 in the film 10.

The film 10 may be produced on a standard laminating machine, such as available from Dri Tech, New Berlin, Wisconsin. The similarity in shrink characteristics of the substrate 12 and second layer 14 eliminates problems caused by the heat shrink associated with production. A roll of substrate 12 and a roll of the second layer 14 are held separately on the laminating machine. The rolls are unwound into the lamination process while the machine speed is set at approximately 300 to 400 feet per minute, the oven temperature at approximately 22° C.-82° C. (72° F.-180° F.), the web temperature at the same temperature as the oven, and the adhesive applied at a weight of 1.25±0.25 lbs. per ream. The laminator nip temperature should be approximately 65° C. (150° F.) and the nip pressure should be approximately 30–50 P.S.I. using a first treater set at 20 to 40% and a second treater set at 50 to 90%. The chill rolls should set the film 10 running at 15° to 27° C. (60° F.-80° F.).

Figure 2:
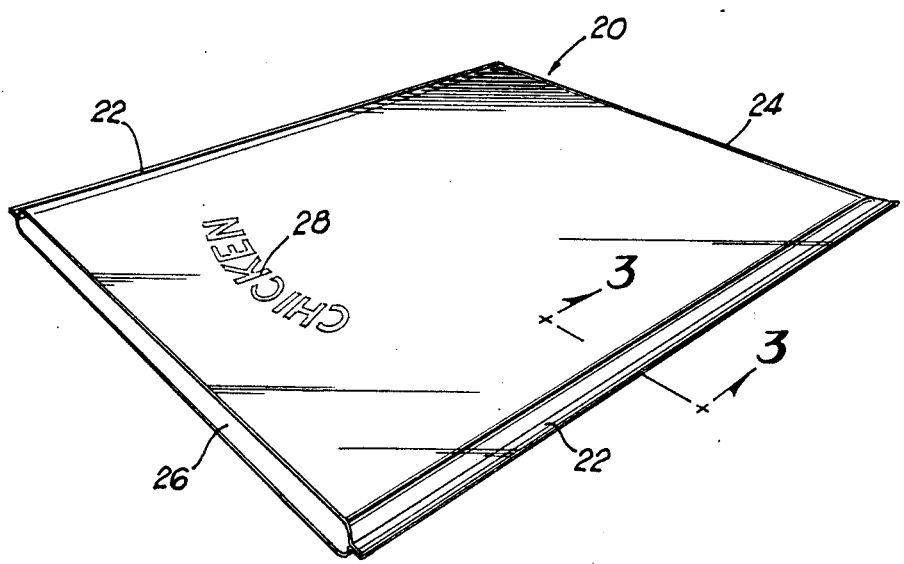
FIG. 2 is a perspective view of a heat-shrinkable bag made in accordance with the present invention.
Figure 3:
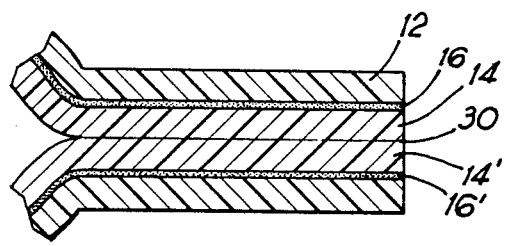
FIG. 3 is a cross-sectional view of a side of a bag made in accordance with the present invention.

The film 10 may be made into shrinkable bags 24, such as shown in FIG. 2. The bag 24 may be produced by folding a sheet of film 10 into two equal length sections 26,28 so that the substrate 12 comprises the outside portion 30 of the bag 24 and the second layer 14 comprises the inside portion 32. To complete the bag 24, the side edges 34 of the film 10 are heat sealed together, preferably at a low temperature, such as by impulse sealing. As shown in cross-sectional view in FIG. 3, upon application of heat, the second layer 14 of the first section will seal to the second layer 14 of the second section.

What is claimed is:

1. An oriented heat-sealable, heat-shrinkable adhesive laminated film comprising:
   (a) a first layer of heat-shrinkable thermoplastic material;
   (b) a second layer of heat-sealable, heat-shrinkable thermoplastic material, said materials of said first and second layers having similar shrink characteristics; and
   (c) adhesive for adhering said first layer to said second layer.

2. The laminate film of claim 1, wherein said first layer is comprised of polyester.

3. The laminate film of claim 1, wherein said first layer is polyethylene terephthalate.

4. The laminate film of claim 1, wherein said second layer is comprised of a polyolefin.

5. The laminate film of claim 1, wherein said second layer is comprised of polypropylene.

6. The laminate film of claim 1, wherein said second layer is polyethylene.

7. The laminate film of claim 1, wherein said second layer is comprised of ethylene-methacrylic acid di- and ter-polymers.

8. The laminate film of claim 1, wherein said adhesive is polyurethane.

9. The laminate film of claim 1, wherein said adhesive is a water based adhesive.

10. A heat-sealable, heat-shrinkable package, comprising:
    (a) a first sheet of oriented heat-sealable, heat-shrinkable laminate film comprising:
        (i) a first layer of heat-shrinkable thermoplastic material;
        (ii) a second layer of heat-sealable, heat-shrinkable thermoplastic material adhered to said first layer, said materials of said first and second layers of said first sheet having similar shrink characteristics;
(iii) an adhesive securing said first layer to said second layer; and
(b) a second sheet of oriented heat-sealable, heat-shrinkable laminate film comprising:
(i) a first layer of heat-shrinkable thermoplastic material;
(ii) a second layer of heat-sealable, heat-shrinkable thermoplastic material adhered to said first layer, said materials of said first and second layers of said second sheet having similar shrink characteristics;
(iii) an adhesive securing said first layer of said second sheet to said second layer of said second sheet; and
(c) means for joining said second layer of said first sheet to said second layer of said second sheet to form said package.

11. The package of claim 10, wherein said first layer of said first sheet and said second sheet is comprised of polyester.

12. The package of claim 10, wherein said first layer of said first sheet and said second sheet is polyethylene terephthalate.

13. The package of claim 10, wherein said second layer of said first sheet and said second sheet is comprised of a polyolefin.

14. The package of claim 10, wherein said second layer of said first sheet and said second sheet is comprised of polypropylene.

15. The package of claim 10, wherein said second layer of said first sheet and said second sheet is polyethylene.

16. The package of claim 10, wherein said second layer of said first sheet and said second sheet is comprised of ethylene-methacrylic acid di- and ter-polymers.

17. The package of claim 10, wherein said adhesive is polyurethane.

18. The package of claim 10, wherein said adhesive is a water based adhesive.

19. The package of claim 10, wherein said joining means comprises heat sealing at low temperature.

20. The package of claim 10, wherein said joining means comprises heat sealing.

* * * * *